(12) United States Patent
Stamm Kristensen et al.

(10) Patent No.: US 9,010,073 B2
(45) Date of Patent: Apr. 21, 2015

(54) MOBILE DOSING, MIXING AND PACKAGING PLANT

(75) Inventors: Henrik Stamm Kristensen, San Ginés (ES); M. Maravillas Martinez Lopez, San Ginés (ES)

(73) Assignee: Inversiones HIK16, S.L., San Gines (ES)

( * ) Notice: Subject to any disclaimer, the term of this patent is extended or adjusted under 35 U.S.C. 154(b) by 583 days.

(21) Appl. No.: 13/323,229

(22) Filed: Dec. 12, 2011

(65) Prior Publication Data
US 2012/0151877 A1    Jun. 21, 2012

(30) Foreign Application Priority Data

Dec. 16, 2010  (EP) .................................... 10382338

(51) Int. Cl.
| | |
|---|---|
| *B65B 61/00* | (2006.01) |
| *B65B 1/00* | (2006.01) |
| *A23N 17/00* | (2006.01) |
| *B65B 65/00* | (2006.01) |

(52) U.S. Cl.
CPC ................ *B65B 1/00* (2013.01); *A23N 17/007* (2013.01); *B65B 65/003* (2013.01)

(58) Field of Classification Search
CPC .................................... B65B 1/32; B65B 3/28
USPC ....... 53/136.1, 136.5, 111 RC, 502, 570, 571, 53/52, 138.5, 428, 111 R; 206/528, 540, 206/534.1, 219, 220, 736, 748; 141/10; 177/25.18
See application file for complete search history.

(56) References Cited

U.S. PATENT DOCUMENTS

| | | | | |
|---|---|---|---|---|
| 3,707,172 | A * | 12/1972 | Obara | 141/59 |
| 4,563,858 | A * | 1/1986 | Van Der Wal et al. | 53/418 |
| 4,716,768 | A * | 1/1988 | David et al. | 73/861 |
| 5,516,009 | A * | 5/1996 | Kautz | 222/238 |
| 6,331,070 | B1 * | 12/2001 | Desai | 366/197 |
| 6,835,900 | B2 * | 12/2004 | Jones | 177/145 |
| 2006/0231295 | A1 * | 10/2006 | Yamaguchi et al. | 177/25.18 |

* cited by examiner

*Primary Examiner* — Stephen F Gerrity
*Assistant Examiner* — Joy N Sanders
(74) *Attorney, Agent, or Firm* — Arent Fox LLP

(57) ABSTRACT

The main objective of this invention is a Mobile plant for dosing, mixing and packaging of powdery products, characterized because it is comprised of a carrying structure and several areas for: reception and weighing, loading, mixing, sack filling, sewing and labelling, metal detection, palletizing and cleaning. This invention is included within the industrial plants technical sector of manufacturing and mixing of powdery products.

12 Claims, 6 Drawing Sheets

MOBILE DOSING, MIXING AND PACKAGING PLANT

The main objective of this invention is a mobile dosing, mixing and packaging plant for powdery, granular and other products with similar characteristics that is characterized because it is comprised of a carrying structure and several areas within this structure that are called reception and weighing, loading, mixing, sack filling, sewing and labelling, metal detection, palletizing and cleaning. This invention is included within the industrial plants technical sector of manufacturing and mixing of powdery products, such as those used in the agro food industry, without limiting its application to products with similar characteristics in other sectors.

PRIOR STATE OF THE ART

Traditionally, powdery products mixing machinery and plants are comprised of different phases for the product to be mixed, which operates in a vertical direction; in other words, transitions from one phase to another occur from top to bottom, aided by gravity.

An example of this is a Spanish patent with request number P0381423, "Machine for treating or mixing powdered, granular or doughy products" ("Máquina para el tratamiento o mezcla de productos pulverulentos, granulados o pastosos") and characterized because it includes a bucket with its lower part widened and upper part progressively narrowing, with the height of the part that progressively narrows being the same size as at least the widened part and a device located near the bottom of the bucket that pushes the particles or grains located inside this bucket upward.

The applicant, who is a subject matter expert, does not know of any mobile plant that includes the characteristics described herein and are claimed in this descriptive report.

DESCRIPTION OF THE INVENTION

A purpose of this invention is a mobile plant that is capable of dosing, mixing and packaging powdery, granular or other similar products, and transport them in a certified container measuring 40 feet and which operates on a standard horizontal surface, using all the required machinery, auxiliary items and tools.

A purpose of this invention is a mobile plant whose operation is remote controlled, ensuring complete control of the product and its traceability, including a real time connection with a control centre designed for this purpose, at a location that is different than the location of the mobile plant itself.

A purpose of this invention is the optimization of costs associated with production and the optimization of the product delivery time (time to market), ensuring compliance with current legislation and the easy operation of the plant, thus guaranteeing compliance with the current legislation of each destination country of the production line for the product that is to be manufactured.

Another purpose of this invention is the possibility of developing the initial formulas for the end products using raw materials from the local area where the plant has been installed; in such a way, that for the manufacturing of products at each destination, you can use the characteristics and functionalities of the local raw materials from each country.

Finally, it is a purpose of this invention, to devise a quick and efficient production plant that includes an optimized assembling process, which allows starting operations and transporting the plant in a completely safe manner.

The mobile plant described in this invention includes a carrying structure that is configured to be inserted inside a standard maritime shipping container that has no deformations, with a parallel pipe shape and configured to house all the items that comprise the plant inside it, and arranged horizontally. These items are comprised of:

(i) A first area for reception and manual weighing of the different final product components that comprise the formula for the product that will be mixed and placed inside sacks, and subsequently transported to the load area by means of a heavy raw material stacker.

(ii) A second area that includes a material loading area that is configured to introduce the powdery material that was already weighed in the first area into a total volume container; inserting the products according to the formula, using a stacker that will unload the sacks received in the first area onto a hopper, and then passing through a sieve, and into a previously labelled container.

(iii) A third mixing area where the container that was loaded in the second area is transported and placed under the powdery products mixer where the mixing is carried out. For this, the mixer holds the container using a set of claws and turns the container upside down and in a vertical position, subsequently returning it to its initial position once the product is mixed, separating the container from the mixer.

(iv) A fourth area for sack filling, configured for the position of the container, which is held by a set of claws and turned vertically 180°, on top of the sack filling machine, proceeding with the filling and weighing of the sacks, their subsequent sewing and labelling.

(v) And a fifth metal detection area, configured to prevent the possibility that the sacks could contain any metallic particle, manual palletizing of the sacks and cleaning of the container so it can be used again.

The carrying structure has a parallel pipe shape and is capable of holding all the items that comprise the plant inside. It is made up of several types of square pipes, supported at several support points, which provide it with rigidity. In its preferred embodiment, one of its sides can be disassembled into three parts that make up the work area. The structure also has a ladder for accessing the upper part at one end of the platform in order to access the product loading area. The structure assembly with its sides folded can be inserted into a standard sized container for maritime transport as mentioned before, preferably into a 40 foot maritime shipping container.

Prior to weighing, all the raw material will be identified when it reaches the warehouse using barcode labels in accordance with manufacturer specifications, for identification during the weighing phase. The reception and weighing area is precisely configured for weighing the product, which is carried out separately on the structure's hinged surface where the operator will weigh the different items used to devise the formula, inserting these into a sack. Once the sack is weighed and closed, it will be placed on the pallet with the rest of the sacks that comprise the lot. Everything directed and controlled by the plant's PLC, which will direct the work for the operator while it records everything that has been carried out and will provide the labels to be placed on the sacks and ensure traceability.

The aforementioned labels corresponding with the weighed ingredient lot for its identification during the loading will be placed on the sacks. These labels will include the exact Kgs. weighed and will identify the lot of the formula to which the ingredient to be manufactured belongs to. Once the pallet is completed, it will be stored in order, or it will be lifted to the loading area using a stacker in order to continue with the manufacturing process.

Once the sacks are ready at the platform, the requested container will be placed on the loading platform. If the container is the correct one as read by a frequency meter, the container will be raised and will be closed by a set of claws in order to proceed with the loading. At the loading area, one ingredient at a time will be requested from it: the barcode for the ingredient will be read and if it is the correct one ordered by the system, it will request loading of said ingredient and the loading will be activated (rotating valve and sieve) and the sack will be cut by the operator using a razor hooked to a chain that prevents the razor from being dropped inside with the product and will pour all the contents of the sack into the hopper, discarding the empty sack to the side. The aforementioned unloading hopper will have a grill and a suction orifice to prevent dusty material from escaping. The contents of the hopper will fall onto a sieve, through the rotating valve. This procedure is developed and conceived to eliminate any undesired product that may have been included with the raw material from the rest of the process. The sieve will be located at the proper height in order to horizontally extract the rotor for inspection and/or cleaning. Once sieved, the proper amount of product according to the formula will fall into the container located below the sieve. The total volume container will be hermetically attached to the sieve in order to prevent dusty product from escaping when the container is being filled. The container will be labelled for follow-up and traceability.

Once the container is full, it is transported to the mixing area, placed under the mixer and once it is securely attached to the mixer, the container will be turned upside down and the mixing process will commence, which will homogenize the product. This step is essential to achieving a quality product. To accomplish this, a mixer with three arms has been designed that softens the process, an intensifier that is perpendicular to the mixer's generatrix, and both with frequency variators that program its speed, time and operating mode; all of this providing heartiness to the process. The tight sealing of the mixer is achieved using special sealing designs with long durability and air tightness guaranteed. Once a certain time has elapsed and the mixing is completed, the container is returned to its initial position where it is separated from the mixer and transported to the packaging area.

Once the contents of the container have been mixed and homogenized, it is transported to the sack filling or packaging area, where using a container dump system, we position it on the upper part of the sack filling machine where the product is placed in sacks and the sacks are then weighed. There will be a suction point on the cone that is located on the upper part of the sack filling machine used to suction any powdery product that may be generated during the sack filling process. The filled sacks are sent to the sewing and labelling area, where the sacks are sewed using a sewing machine that is hanging from a davit.

All the sacks that have been previously sewed will pass by the metal detection area, placing them on a conveyor belt that moves longitudinally through a detector in order to prevent the possibility that the sacks could contain any metal particles. Then, the sacks that are exiting the metal detector will be manually palletized and labelled to identify the lot they belong to. Once the container is emptied, it will be manually cleaned using a suction vacuum. The operator will be located on a platform in order to comfortably carry out this task and the container will be labelled indicating it is clean and ready to be re-used.

With the plant as described, it can be placed and transported inside a standard 40 foot container along with all the required machinery, auxiliary items and tools. It is also designed to be installed indoors, protected from the weather, in a ventilated area, and placed on a floor that is level and able to withstand the aforementioned loads.

Traditionally, in powdery products mixing plants, the different phases of the product to be mixed operates in a vertical direction; in other words, transitions from one phase to another occur from top to bottom, aided by gravity. In this line, the concept is different, the different phases move horizontally, which facilitates the work, transport and operability by simplifying the process without compromising safety and traceability, for the purpose of minimizing the errors that may be made by personnel working at the plant and facilitating the follow-up of the manufacturing sequence as it has been projected, and implementing the necessary monitoring and control measures from the central station.

The cleanliness of the plant facilities is excellent thanks to an attractive design of the installations and Environmental protection measures, exercising proper oversight of the waste generated by the plant, which are sacks that will be pressed each work shift to be properly disposed of afterwards. No other environmental hazards will be present since the evaluation of the plant during the commissioning will be taken into account, studying and complying with environmental requirements such as: Air Pollution, Liquid waste, Solid waste, Noise and Odours.

Another additional advantage of the plant is that it allows for monitoring the installed machinery, managing of spare parts and the preventive, predictive and corrective maintenance to handle any failures that may occur, ensuring the process continues from a distance without stoppages for manufacturing, calibration and maintenance of machinery.

The described plant allows for identification of each product via a traceability system throughout the entire food chain process, resulting in a redundant guarantee of safety of all manufactured products and implementing quality assurance in the processes and the final product. This way, we can exercise quality control of the products manufactured on site and in line with a control station.

Throughout the description and claims, the word "encompasses" and its synonyms do not intend to exclude other technical characteristics, additions, components or steps. For experts in the field, other objectives, advantages and characteristics of this invention will in part be derived from the description and in part from placing the invention into practice. The following examples and drawings provide an illustration and are not intended to limit this invention. Additionally, this invention covers all the possible combinations of particular and preferred performances indicated herein.

DETAILED DESCRIPTION OF THE EMBODIMENT AND EXAMPLE OF A PRACTICAL EMBODIMENT

Figure 1:
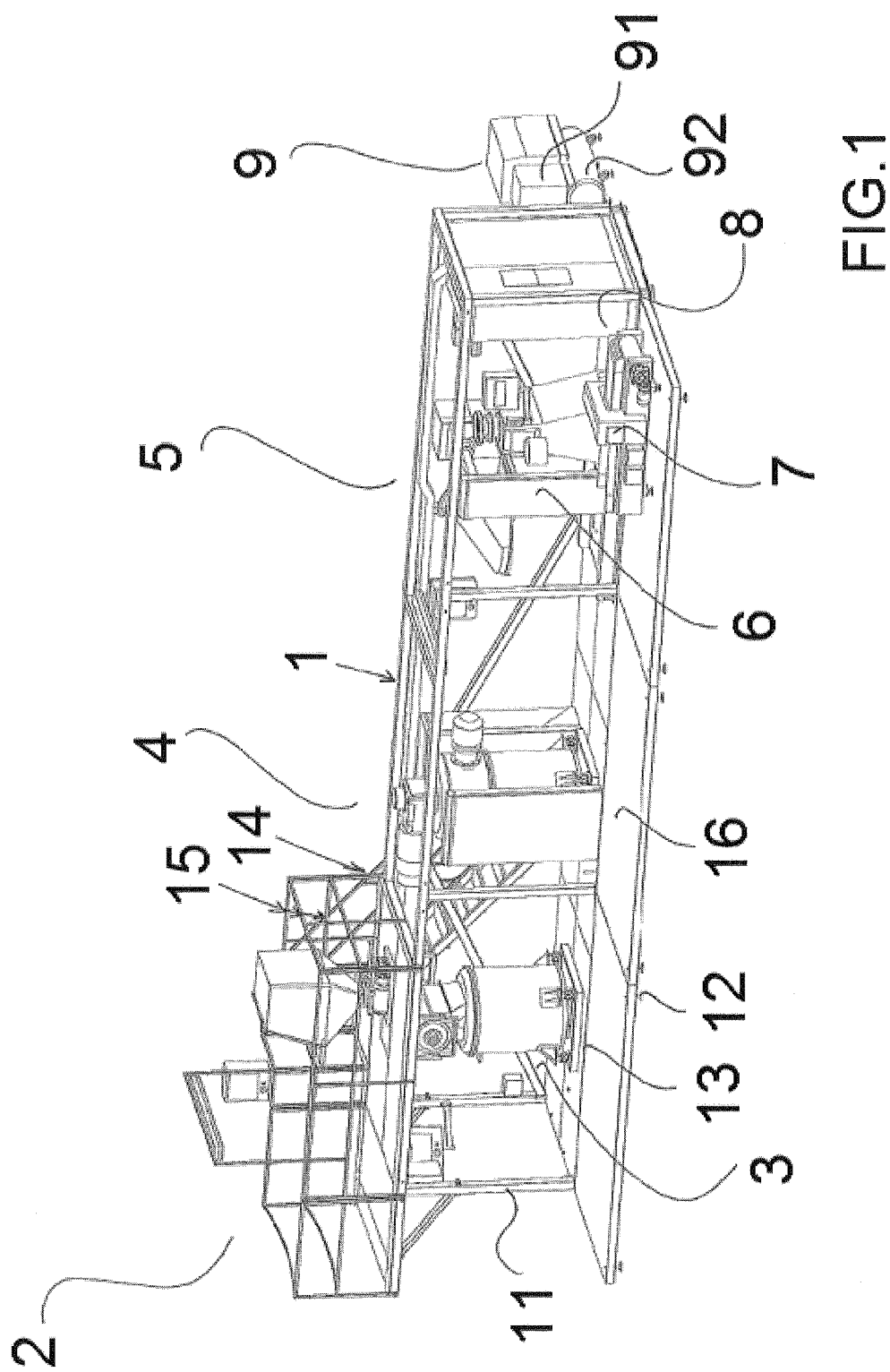
FIG. 1. Shows a perspective view of the mobile powdery products mixing plant and its carrying structure, purpose of this invention.

As can be seen in the attached figures, the mobile plant for dosing, mixing and packaging of powdery products is characterized for being comprised of a carrying structure (1) and several areas for: reception and weighing (2), loading (3), mixing (4), sack filling (5), sewing and labelling (6), metal detection (7), palletizing (8) and cleaning (9).

Figure 2:
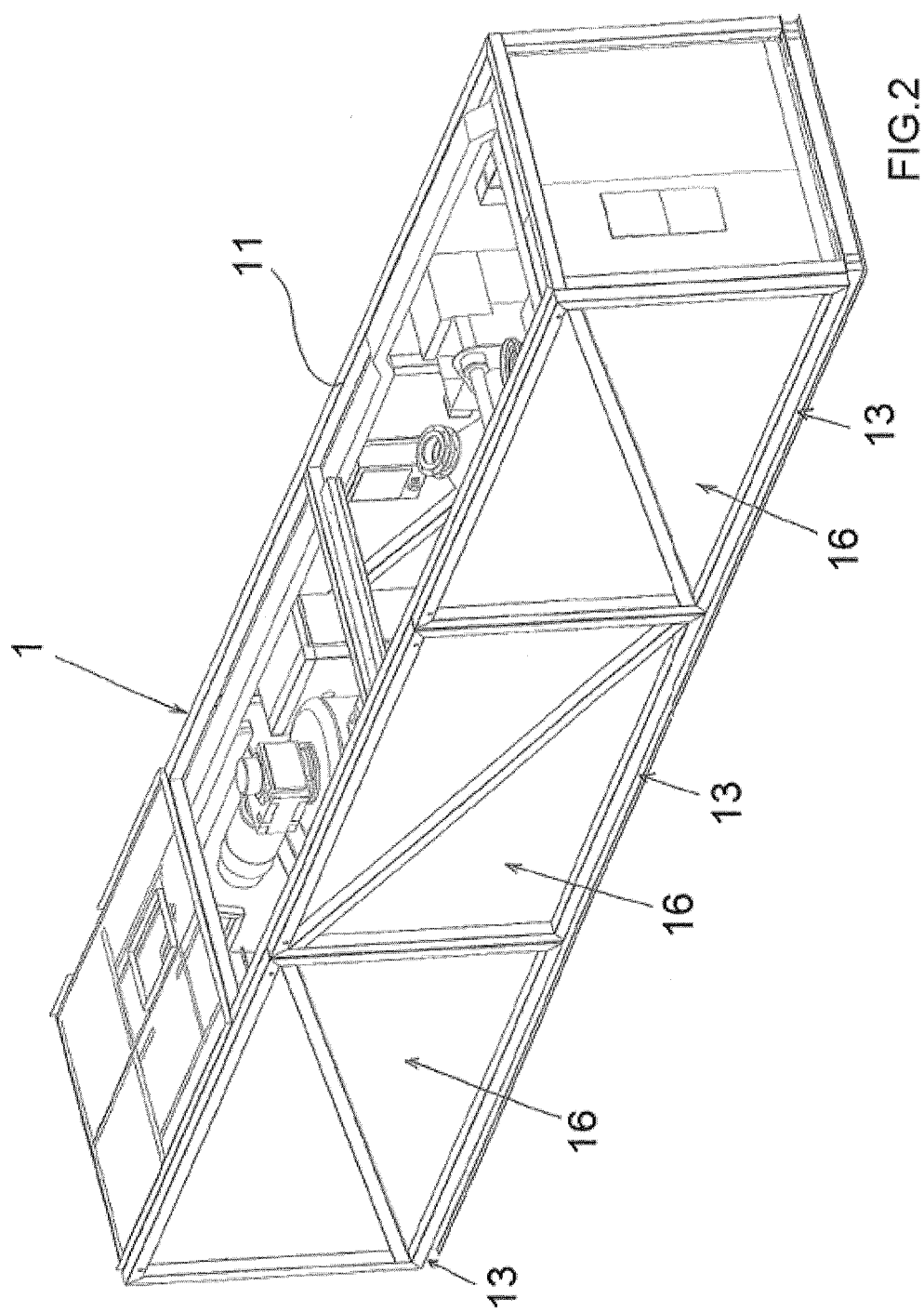
FIG. 2. Shows a perspective view of the mobile powdery products mixing plant and its carrying structure, purpose of this invention, in the transport position.

As can be seen in FIG. 1, the carrying structure (1) is comprised of several square pipes (11) supported on several supporting points (12) with an adjustable height, several hinges (13) and a ladder (14) with a safety hand rail (15). The dimensions of this structure will not be greater than a standard 40 foot container, so that in the transport position (FIG. 2), its total size enables it to be transported in a standard size container.

In an example of a practical embodiment, the structure (1) will be constructed using stainless steel square pipe. The floor of the structure will be comprised of carbon steel laminate profiles. The structure's profiles and crossbeams will be made of stainless steel square pipe. The structure (1) will be supported by six support points with adjustable height over which the diamond plate sheet metal rests, over which objects and personnel move about. A side (16) will fold in three sections and will also be constructed using square pipe and diamond plate sheet metal. The aforementioned hinges will fold the aforementioned sides using a number of capstans, for easy installation and positioning.

The access ladder (14) will be constructed in stainless steel, except for the steps, which will also be made of stainless steel anti-skid sheet metal. A rectangle will be located at the end of the ladder to provide access to the upper part of the platform. The upper part and the access ladder includes a safety hand rail (15) to protect the entire perimeter, which is made of stainless steel square pipe.

Figure 3:
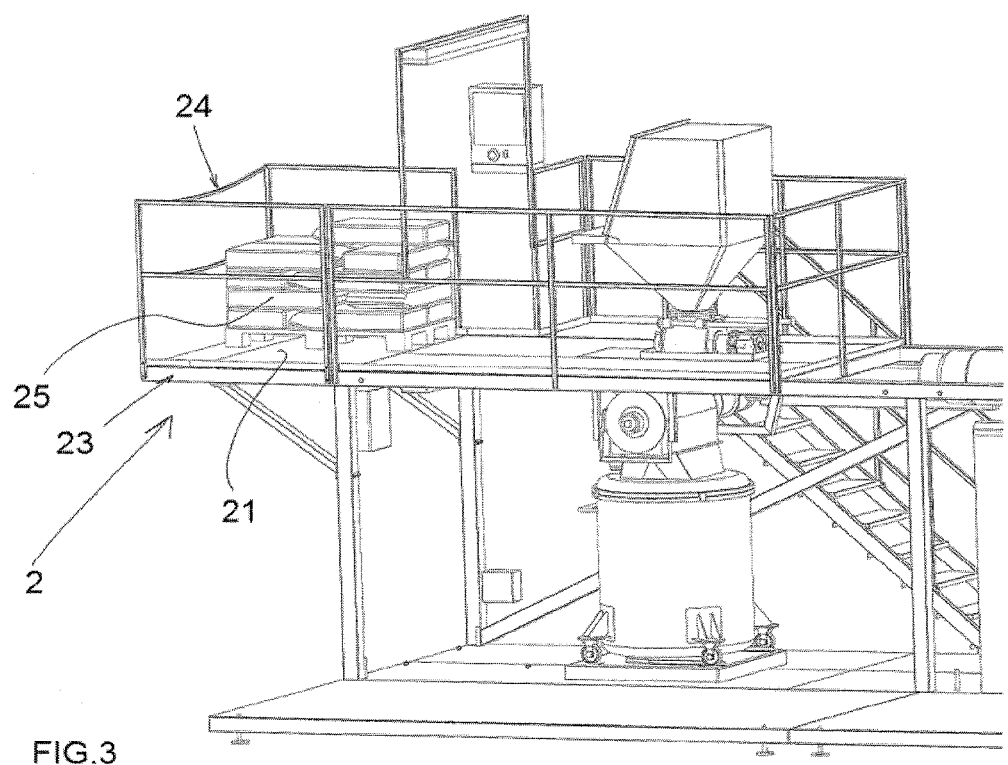
FIG. 3. Shows a schematic figure of the first reception and weighing area, which is an integral part of the plant, purpose of this invention.

In FIG. 3, we can see that the reception and weighing area (2) is comprised of a rectangular base (21), a variety of hoisting elements, a number of profiles (23), a safety rail (24), a heavy pallet stacker (25) and a weight scale. In a practical embodiment, the weighing is carried out using a commercial weight scale for this purpose. This weight scale will be connected to the labelling system and to the measuring and control system.

The already weighed product will be transported to the loading section by means of a load stacker to a maximum variable height with a maximum load that will also be variable.

Figure 4:
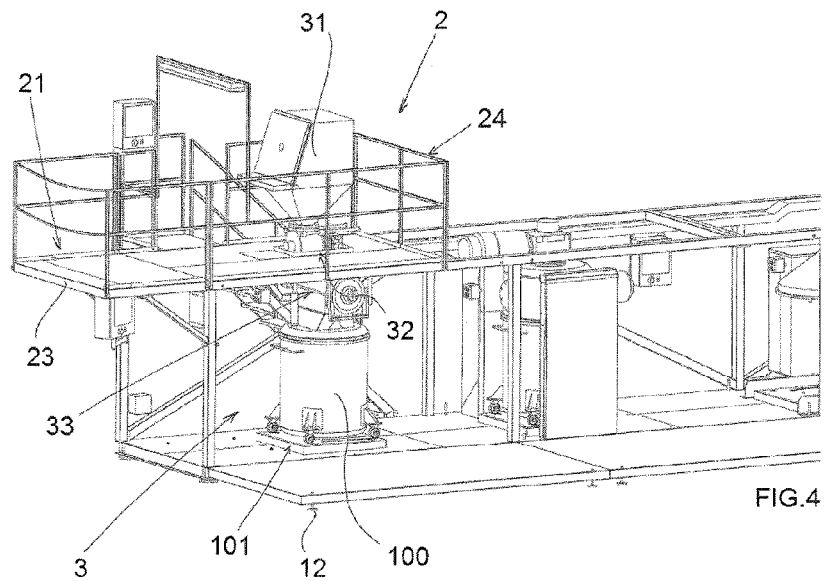
FIG. 4. Shows a schematic figure of the second loading area, which is an integral part of the plant, purpose of this invention.

FIG. 4 shows that the loading area (3) is comprised of a loading hopper (31), a rotating valve (32) and a sieve (33). Feeding of the product will be carried out in the hopper tank (31), constructed in stainless steel, which will have an opening on the side and a tray on the entire surface of this hopper (31), which is used to lay the sacks upon, open them and unload their contents. It will have a grille inside to retain undesired particles. This screen will have an 8 mm span in a particular embodiment, although it may be changed for a greater or lower span depending on the specific specifications of each installation, user or client.

At the lower part of this hopper tank (31) there will be a rotating valve (32) that will feed the sieve (33). At the upper part, it will have a mobile vacuum powder extraction device.

The rotating valve (32) will be constructed in stainless steel at all parts that are in contact with the product and it will be located between the loading hopper (31) and the sieve (33). This valve will include eight rotating blades, driven by a reduction worm gear motor. The air tightness of the shaft is achieved by injecting compressed air next to the seal retainer. The valve's turning speed will be fixed, ensuring a uniform and continuous feeding of the sieve (33). The construction of the rotating valve allows for a quick disassembly and easy cleaning since it does not have any hard to access corners and also due to the interior finish of the surface.

The sieve (33), by means of its centrifugal effect, causes different size substances to pass through the screen as per the user-client specification and the product to be passed through it. This sieve (33) will include an additional hopper where the product is unloaded that enables coupling with the container (100).

The hopper will carry out the transition from the rectangular exit from the sieve to the container's circular opening. This circular area will have a ring with a flexible gasket to accomplish an air tight seal and will have a number of pneumatically operated sealing clamps that will hold the container while it is being loaded.

This area will have a vent hole with a sleeve filter. The function of this vent hole will be to vent the excess air created during the loading of the product.

A pneumatically operated lifting table will be located on the floor where the container (100) will be placed, whose function will be to lift the container (100) and apply pressure on the gasket until the clamps close.

The container (100) holding system at the load area (3) will have the following sequence:

1. Placing the container in the area up to the indicated position. To accomplish this, guides will be placed on the floor over the lifting table.
2. Raising of the table until the container applies pressure on the filler hopper gasket.
3. Operation of the sealing clamps.

Holding of the container (100) while it is being loaded will be accomplished using a number of pneumatically operated clamps. These clamps are irreversible, with a mechanical locking system. Mechanical locking is a safety system that once the locked position is reached, will remain locked in spite of drops in the air pressure. Once the locked position is reached, the cylinder will not retract when external forces act on the holding arm. The clamp can only be opened by activating the cylinder's forward chamber.

The clamps will have inductive detectors to indicate their position, open or closed. The sealing clamps will have support claws where height regulators will be located to adjust the gasket's tightening torque.

The container's (100) lifting table (101), in this non-limiting practical example, is comprised of a stainless steel plate. At its bottom it will have two pneumatic cylinders with inductive detectors to indicate their position, open or closed. This platform will include loading cells to control the weight when the filling is complete by product lot and detect errors if applicable regarding missing ingredients during the monitoring of the filling sequence. Also to detect that the positioned container is completely empty prior to filing the container.

Figure 5:
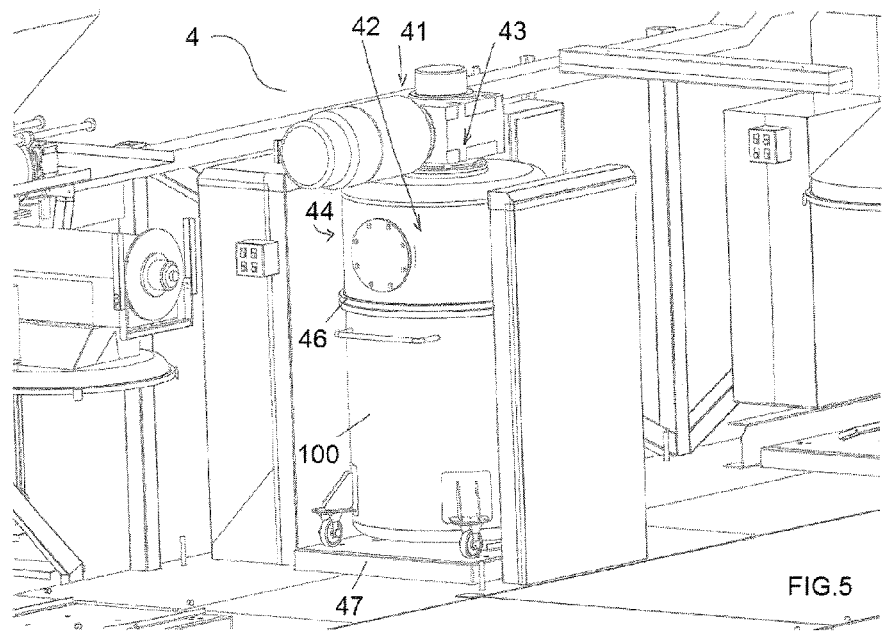
FIG. 5. Shows a schematic figure of this mixing area, which is an integral part of the plant, purpose of this invention.

In FIG. 5, we see that the mixing area (4) is made up of a mixer (41), comprised of a cylindrical container (42), a slow central shaker (43), a side intensifier (44), several clamps, a ring that houses an air tight seal (46), a lifting table (47), two welded semi axles, two supports with bearings and a motor operated planetary gearbox, as well as a mixer venting system, by means of a side filter that is automatically activated at the moment prior to releasing the mixed container in order to vent the product and not cause an overpressure inside the mixer (41).

The mixer (41) is preferably constructed in stainless steel and in this practical example, will be comprised of a cylindrical container (42). The mixer will include a centre slow shaker (43) at its bottom, comprised of a three blade rotor, operated by a reduction motor with frequency variator.

Also, this mixer (41) will include a side intensifier (44), comprised of a shaft with several blades and where each blade, will have two paddles and will be operated by a motor with frequency variator.

A clamp has been placed in front of this intensifier (44) in case the intensifier system is to be duplicated in the future.

The body's cylinder will have a ring on the opposite end of the central shaker that will house a gasket for sealing the container. Likewise, it will have a plurality of holding clamps, identical to those described in the loading area (2); it will also have a lifting table (47) with the same function as described for lifting table (101) of the loading area (2).

The turning of this mixer will be accomplished via two semi-axles on the cylindrical-vertical part with one of them supported on a support with bearings and the other one on a motor operated planetary gearbox.

To turn this reduction motor, which in the preferred embodiment is hydraulic, but could be electric or any other equivalent type, will be arranged inside its column in a hydraulic pack, which is basically comprised of a tank with gasket and a cover for the tank. It will include a gear pump with a bell and coupling to an electric motor. It will also include a base plate with an adjustable safety valve and three air operated valves for operating the hydraulic motor. It will also include a flow regulator in the line to regulate the turning speed, stopping at any turning point, depending on whether or not the mixture is optimum. The hydraulic motor acts as a brake in case the gear pump is stopped voluntarily or due to a power failure, preventing the mixer from moving. It will include position detectors at the container locked position as well as the 180° turn position. This hydraulic pack will be connected to the hydraulic pack located in the sacking area, operating simultaneously or only one of them.

Figure 6:
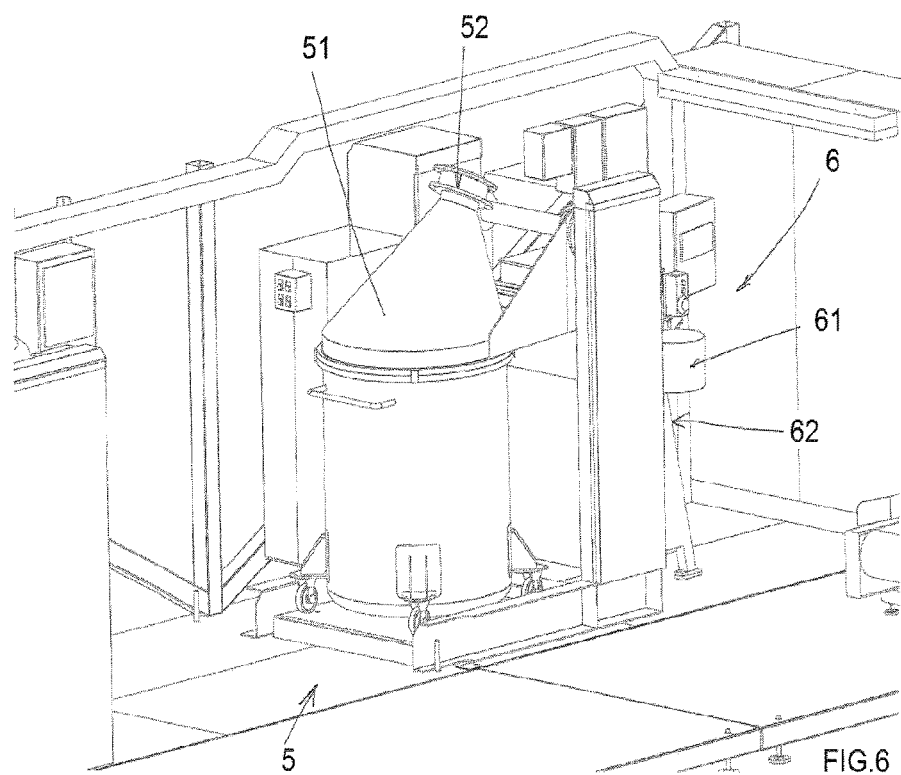
FIG. 6. Shows a schematic figure of the sacking, sewing and labelling area, which is an integral part of the plant, purpose of this invention.

FIG. 6 shows that the sack filling area (5) is comprised of a dump hopper (51) and sack filler (52).

The container coming from the mixing area described in the previous step, will be introduced in the sack filling machine's lifting system, consisting in a conic hopper constructed in stainless steel, that spins about a shaft supported by an L shaped crank.

The hopper (51) will have a ring with a flexible gasket to accomplish an air tight seal and will have a number of pneumatically operated sealing clamps that will hold the container while it is being unloaded. This area will have a vent hole with a sleeve filter 50 mm in diameter. The function of this vent hole will be to vent the excess air created during the unloading of the product.

A pneumatically operated lifting table will be located on the floor where the container will be placed, whose function will be to lift the container and apply pressure on the gasket until the sealing clamps close.

The container holding system at the unloading area will have the following sequence:

1. Placing the container in the area up to the indicated position. To accomplish this, guides will be placed on the floor over the lifting table.
2. Raising of the table until the container applies pressure on the dump hopper gasket.
3. Operation of the sealing clamps.

The top part of the hopper (51) will include a butterfly valve that will be closed during the entire lifting sequence and will open when unloading. The valve will be pneumatically operated. A discharge apparatus will be placed inside the hopper, which will be operated by an external reduction motor.

Hopper (51) will also include a central axis with scheduled air outlets, depending on the product, to facilitate the dumping of said product and will also include a hammer and vibrator to carry out these same functions.

The raising and turning of the dump hopper will be accomplished about an axis, with one of its ends supported on a motor operated planetary gearbox. The turn will be approximately 155°. The reduction motor will be housed on one side of the L shaped crank and will be operated by a hydraulic pack identical to the one described in the mixing area, in the preferred embodiment with hydraulic motor.

This section will include a pneumatically operated vibrator that will be used to handle any possible obstructions encountered during the product filling process.

Holding of the container while it is being unloaded will be accomplished using a number of pneumatically operated clamps. These clamps are irreversible, with a mechanical locking system. Mechanical locking is a safety system that once the locked position is reached, will remain locked in spite of drops in the air pressure. Once the locked position is reached, the cylinder will not retract when external forces act on the holding arm. The clamp can only be opened by activating the cylinder's forward chamber.

The clamp will have a pneumatic cylinder that ensures a determined force that is appropriate to secure the container. The clamps will have inductive detectors to indicate their position, open or closed.

The sealing clamps will have support claws where height regulators will be located to adjust the gasket's tightening torque.

FIG. 6 indicates that the sewing and labelling area (6) is comprised of a davit (61) from which it hangs attached to a sewing machine (62).

The sack filling machine will be a commercial weighing-packaging machine with its own electronic equipment, easy to use and with large capacity for information. Among its operating functions, we can highlight the current weight display; previous weight display; packaged units display; total weight packaged display; thick flow regulation; thin flow regulation, automatic regulation of thick doser flow; self setting to zero at the start of the cycle; manual start selection; cancel dosing selection; rated weight, thick dosing and thin dosing programming functions; programming the initial delay; programming the final delay; programming the number of packages, programming the weight to be packaged, vibration charge, adapter for sacks with opening with demand and loading with endless spindle.

It includes a manual vacuum for extracting the powdery product during the filling phase and manual cleaning of the filling area. It will also include a weight scale to ensure the sacks are filled to the proper weight.

Figure 7:
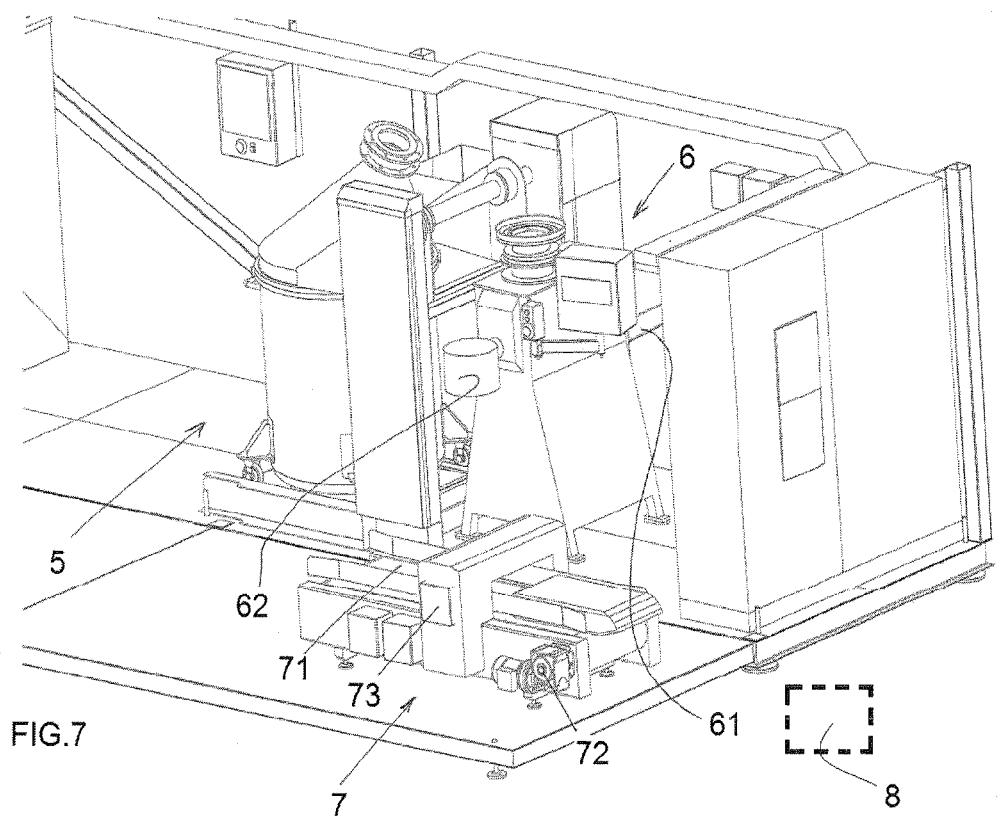
FIG. 7. Shows a schematic figure of the fifth metal detection, palletizing and cleaning area, which is an integral part of the plant, purpose of this invention.

FIG. 7 shows the metal detection area (7), which is comprised of a conveyor belt (71) operated by a reduction motor (72) and a metal detector (73).

Once the sacks are closed and labelled, they will be placed over a conveyor belt, operated by a reduction motor, where a metal detector will be placed at the centre of said belt, installed in such a manner, that the entire width of the belt passes through the metal detector.

The metal detector is a commercial type and has a data output that can be connected to the computer system. There will be a barcode reader next to the metal detector that will read all the sacks that pass through the detector and will identify if any sack must be rejected because it contains some type of metal.

The palletizing area (8) is comprised of a variety of pallets and a weight scale used for weighing the pallets. Once the sacks have passed through the metal detector, these will be stacked on pallets up to a maximum weight value. These pallets will be weighed using a weight scale to determine the weight of each unit.

The cleaning area (9) is comprised of a vacuum (91) and several containers (92).

A cannula will be available in the cleaning area to suction all the containers using the vacuum. The cannula will be hanging from a davit in order to facilitate its movement and handling.

The vacuum is a manual type, single phase for safety, certified for explosion proof areas, for collecting liquids and/or powdery materials, commercial type whose characteristics may vary.

The containers (100) are cylindrical-vertical shaped with enough capacity for the production that wants to be achieved and all the elements required for this purpose such as the ring and the cover with top handle, and the four lower supports where the swivel type wheels are installed that allow to easily slide the container.

Auxiliary Services and Equipment Required for the Normal Operation of the Plant.

It will include an oil free air compressor, which will supply air to all the plant's equipment via a line that will run from the compressor chamber, via a metal line, through the entire structure that contains the equipment, branching off to each section, with a quick disconnect fitting and a shutoff valve.

The supply pressure will be a maximum of 8 bar and the corresponding pressure reducers will be placed at each usage point. The air compressor will be a commercial type, over a horizontal, soundproofed and oil free tank. Obviously, if the area where the plant is to be installed has its own compressed air system, this part will be eliminated from the final installation.

Plant Command and Control System.

The production operations are directed from a central PLC, which basically responds to an assurance of the dosing, traceability throughout the different parts of the process and a list that contains each one of the important parameters in the process that affects the product. All of this will be interlocked in a communication system to access all the data from the group's central station and operate from the central station.

To accomplish this, a series of stations, with software that is suitable for the input/output requirements, which enable the process to be traceable, while the PLC will monitor these inputs/outputs using a program and standard process that must accompany the product.

The same information will be displayed in each of the screen stations, which is the same information that is seen in real time from any point via the internet, with the difference that the corresponding operator will only be able to operate the part corresponding to the plant he is in.

The information that will appear on the screens will be the following:

List of manufacturing orders scheduled for a day. These manufacturing orders will be differentiated by colour, depending on the status they are in: Not started, ingredients prepared, load in mixer, Unloaded in the container, unloaded in the sack filling machine, and completed. The date, time and number of the operator that has carried out the action will be stored in each of the steps of each of the phases. When a manufacturing order has been completed in the sack filling process, all this data will be stored in a database (different from the planning database). The data in this database will be in a non-limiting nor excluding manner, at least the following:

Manufacturing number.
Name of the product.
Date and time the ingredients were prepared.
Number of the operator that has prepared the ingredients.
Date and time the loading of the mixer began.
Number of the operator that has filled the mixer.
Number of the container that has been filled.
Date and time the loading of the mixer finished.
Number of the operator that has finished loading the mixer.
Date and time the mixer was unloaded.
Number of the operator that has started the unloading of the mixer.
Date and time the unloading of the mixer finished.
Number of the operator that has unloaded the mixer.
Date and time the container was emptied into the sack filling machine.
Number of the operator that has unloaded the container.
Date and time the packaging ended.
Number of the operator that has finished the packaging.

The manufacturing orders will be input daily from the operations centre via a SCADA system. For all the above, the operation by phases is defined:

Weighing: In the weighing process, attached to the general electric panel, called CDS1.2, which is located near the safety rail and where the following equipment will be located:
Label reader
Labelling machine
Screen
Data connection with the weight scale.

At this terminal, the PLC includes the following functions:
1. The operator reads the formula he is going to mix on the screen. The contents of the sacks must be known: Weight and Product.
2. The operator will make up the product as indicated on the screen. Then, if this product has a barcode, this code will be read with the reader; if the reader doesn't read it due to a problem with the label or a fault, the operator will then enter the barcode using the keyboard.
3. In response, the printer will print an adhesive label, which the operator will stick to the full sack. In cases where a complete sack is not required, the procedure will be the same except the desired weight will appear on the screen. The operator will carefully open the sack with the raw material and will place an empty sack on the weight scale; he will then use a shovel to add product until reaching the value on the screen. Once this weight has been reached, the printer will print a label which will be placed on the sack with the formula once it has been closed. Subsequently, it will print a second label that will be placed on the rest of the sack with the raw material. The full sacks as well as the formula sacks that are weighed will be placed by the operator on a separate pallet, which we will call "formula pallet".

4. These procedures are repeated for each one of the components that have appeared on the screen, until the formula has been completed. As a result of these procedures, there will be a pallet called "formula pallet" and the rest of raw materials from which the ingredients have been drawn.
5. The PLC has kept records of the following: Ingredients, lot code, quantity within the tolerance and time it was made.

Dosing: The "formula pallet" is transported using a stacker to the loading area, where the operator removes the sacks from the pallet one at a time. A control panel is located near the loading area that is comprised of:
Label reader
Touch screen
Pushbuttons The procedure operated by the central PLC of this plant is the following:
1. The operator will enter the container no. to be loaded.
2. The operator places the sack on the horizontal part of the loading and reads the dosing label with the reader. Once processed by the PLC, the component listed on the screen is displayed in green and the operator opens the sack, and empties it in the loading area.
3. The sieve, rotating valve and the vacuum will automatically begin to operate as long as there is an indication that the container is perfectly set in place at the bottom.
4. The PLC will begin adding the different components of the formula until completing it.

Mixing: The purpose of this part of the process is the homogenizing of the different components of the formula, inserting them into the container's dosing process. For the purpose of controlling this process, we have a control panel connected to the central PLC with the following items:
Screen.

The procedure in this phase is as follows: the operator will check that the formula appears on the screen when the container number is entered. If the container is correct, the process will continue in the following phases:
1. Connect the container to the mixer and once this procedure is complete, a "ready for mixing" indication will appear on the screen.
2. From this moment, the central PLC will be in control of the following parameters.
    a. Speed of the quick shaker and connection times, as well as the slow shaker.
    b. Inclination if applicable. Three 30° angles
3. In other words, the PLC will begin a mixing program using the different parameters from the mixer, depending on the product to be homogenized, recording the times and time it was carried out.
4. Once the mixing program has finished, the mixer will separate the container from the mixing head, and will then indicate this on the screen and by means of a ring tone is applicable. In this phase, the PLC will record the total monitoring of each one of the phases in real time, until the mixer is opened and separated from the container.

Sack filling: The purpose of this procedure is that once the product is homogenized; place it inside individually weighed sacks, checking that no metallic particles are present and labelling to include all the parameters used in the manufacturing process. In this phase, the control panel includes the following equipment:
Labelling machine
Touch Screen
Pushbuttons
Weight scale with data connection.

The entire assembly will be connected to the central PLC, which will include the same process that can be defined in the following paragraphs:
1. The container is brought near the dumper and we enter its number on the screen; if correct, the process begins.
2. Once the container is attached to the dump hopper, the hydraulic mechanism will turn the container upside down.
3. At that time, the sack filling will begin once the operator has placed a sack on the opening.
4. The sack filler will fill the sack with the preset amount, which will be controlled by the PLC.
5. Having reached this point, the doser stops the dosing. The operator transports the sack to the weight scale connected to the PLC and adds/removes product with a shovel until the value preset by the PLC is reached and displayed on the screen.
6. At this time, the label maker prints a label with the product data, visible sales company and production data on the barcode.
7. The operator uses the sewing machine to carry out this task and closes the sack.
8. The sack processed and sewed is transported on the conveyer belt with an integrated barcode reader, and this information is sent to the PLC, recording that the sack passed through the detector with/without any problems. If there is a recurring problem, the sack is rejected.
9. After exiting the detector, the operator can see on the screen how to palletize and what quantity he must place on the pallet.
10. Once this amount is completed, the operator confirms and the label maker prints the pallet label. All these operations are registered in the PLC records, including the times. Also in this phase, when the container is emptied, the dump hopper turns to the vertical position and at that time, removes the hopper from the container and the screen will display if it must be sent to the cleaning area.
11. Cleaning area: The container to be cleaned as indicated by the PLC will be entered on a screen located near the cleaning phase, where the person carrying out the cleaning and the cleaning time will be controlled.

These records will remain in the PLC, which will simultaneously control the on-line process.

The invention claimed is:
1. A mobile plant for dosing, mixing and packaging powdery, granular or other equivalent type products, comprising:
a central operations station configured to remote control the plant; and
a carrying structure configured to be inserted inside a standard maritime transport container free of deformations, rectangular shaped, configured for housing all items that comprise the plant, and arranged in the horizontal plane; and
(i) a first area configured to receive and manually weigh components of a formula for a desired product and to place the components inside first sacks, comprising:
a heavy raw material stacker; and
(ii) a second area comprising:
a material loading area configured to introduce the components into a labelled total volume container such that the contents of the first sacks pass through a hopper and a sieve to the labelled container; and
(iii) a third area configured to receive the labelled container from the second area, comprising:

a mixer configured to grab the labelled container, place the labelled container under the mixer, attach and secure the labelled container thereto, position the labelled container upside down and in a vertical position, and thereafter return it to its initial position once the components therein have been mixed and detach the container from the mixer; and (iv) a fourth area for sack filling configured to position the labelled container in a vertical position on top of a sack filling machine and subsequently weigh and fill second sacks, such that the second sacks are subsequently sewed and labelled; and (v) a fifth metal detection area configured to detect metallic particles in the second sacks, manually palletize the sacks, and clean the labelled container for additional use.

2. A mobile plant for dosing, mixing and packaging powdery products in accordance with claim 1, such that the carrying structure comprises: several square pipes supported on several supporting points with an adjustable height, several hinges, and a ladder with a safety hand rail.

3. A mobile plant for dosing, mixing and packaging powdery products in accordance with claim 1 wherein the first area comprises: a rectangular base, a number of profiles, a safety rail, and a heavy pallet stacker.

4. A mobile plant for dosing, mixing and packaging powdery products in accordance with claim 1, wherein the second area comprises a loading hopper, a rotating valve, and a sieve.

5. A mobile plant for dosing, mixing and packaging powdery products in accordance with claim 4, wherein the loading hopper comprises: a rotating valve joined to a lower portion of the loading hopper.

6. A mobile plant for dosing, mixing and packaging powdery products in accordance with claim 1, wherein the mixer comprises: a cylindrical container, a slow central shaker, a side intensifier, several clamps, a ring that houses an air tight seal, and a lifting table.

7. A mobile plant for dosing, mixing and packaging powdery products in accordance with claim 1, wherein the fourth area comprises: a dump hopper.

8. A mobile plant for dosing, mixing and packaging powdery products in accordance with claim 1, wherein the fourth area comprises: a davit attached to a sewing machine.

9. A mobile plant for dosing, mixing and packaging powdery products in accordance with claim 1, wherein the fifth area comprises: a conveyor belt operated by a reduction motor and a metal detector.

10. A mobile plant for dosing, mixing and packaging powdery products in accordance with claim 1, wherein the first area comprises: a variety of pallets.

11. A mobile plant for dosing, mixing and packaging powdery products in accordance with claim 1, wherein the fifth area comprises: a vacuum and a washer with water.

12. A method for controlling a mobile plant for dosing, mixing and packaging of powdery products in accordance with claim 1 comprising:

using a programmable logic controller (PLC) to control: receiving and weighing of a product; loading of the product; mixing of the product; placing of the product in sacks; sewing and labelling of the sacks; detecting metal in the sacks; and palletizing and cleaning wherein the programmable logic controller (PLC) is remotely connected to a central server and is configured to provide instructions and commands for mixing and configuring a final product.

* * * * *